United States Patent
Shufer et al.

(10) Patent No.: US 9,208,045 B2
(45) Date of Patent: Dec. 8, 2015

(54) TESTING INTEGRATED BUSINESS SYSTEMS

(75) Inventors: Ilan Shufer, Tel Aviv (IL); Alexei Ledenev, Nes-Ziona (IL); Amichai Nitsan, Rehovot (IL)

(73) Assignee: Hewlett-Packard Development Company, L.P., Houston, TX (US)

(\*) Notice: Subject to any disclaimer, the term of this patent is extended or adjusted under 35 U.S.C. 154(b) by 238 days.

(21) Appl. No.: 14/001,710

(22) PCT Filed: Mar. 3, 2011

(86) PCT No.: PCT/US2011/027028
§ 371 (c)(1),
(2), (4) Date: Aug. 27, 2013

(87) PCT Pub. No.: WO2012/118509
PCT Pub. Date: Sep. 7, 2012

(65) Prior Publication Data
US 2013/0339793 A1    Dec. 19, 2013

(51) Int. Cl.
*G06F 11/00* (2006.01)
*G06F 11/263* (2006.01)
*G06Q 10/06* (2012.01)

(52) U.S. Cl.
CPC .......... *G06F 11/263* (2013.01); *G06Q 10/067* (2013.01); *G06Q 10/0633* (2013.01)

(58) Field of Classification Search
CPC .............. G06F 11/263; G06F 11/3414; G06F 11/3664–11/3696
See application file for complete search history.

(56) References Cited

U.S. PATENT DOCUMENTS

| | | | |
|---|---|---|---|
| 7,328,134 B1 | 2/2008 | Burbidge, III et al. | |
| 7,890,806 B2 * | 2/2011 | Kwong et al. | 717/124 |

(Continued)

FOREIGN PATENT DOCUMENTS

| | | |
|---|---|---|
| JP | 2001050865 A | 2/2001 |
| JP | 2001194279 A | 7/2001 |
| KR | 20090083620 A | 8/2009 |

OTHER PUBLICATIONS

Official Journal EPO; Notice from the EPO dated Oct. 1, 2007 concerning business methods, XP007905525.

(Continued)

*Primary Examiner* — Michael Maskulinski
(74) *Attorney, Agent, or Firm* — International IP Law Group, PLLC

(57) ABSTRACT

A method of testing a first business system and a second business system is provided herein. The first business system is integrated with the second business system. The method includes performing a test of the first business system. The method further includes recording, during the test of the first business system, one or more calls from the first business system to the second business system. Also, the method includes identifying the one or more calls from the first business system far testing of the second business system.

18 Claims, 6 Drawing Sheets

(56) References Cited

U.S. PATENT DOCUMENTS

| | | | |
|---|---|---|---|
| 7,966,398 B2* | 6/2011 | Wiles, Jr. | 709/224 |
| 8,572,568 B2* | 10/2013 | Giat | 717/124 |
| 8,977,904 B2* | 3/2015 | Kraus et al. | 714/33 |
| 2007/0092069 A1 | 4/2007 | Royzen et al. | |
| 2008/0306752 A1 | 12/2008 | Wagner et al. | |
| 2009/0172473 A1 | 7/2009 | Lauer et al. | |
| 2009/0271351 A1 | 10/2009 | Kandasamy et al. | |
| 2013/0275946 A1* | 10/2013 | Pustovit et al. | 717/124 |
| 2013/0297973 A1* | 11/2013 | Hyland et al. | 714/27 |
| 2014/0122028 A1* | 5/2014 | Aberg | 703/1 |

OTHER PUBLICATIONS

Author Unknown, <http://swik.net/NHibernate+mono>, Switching Development to Mono <<External Reflections: Why I love extension points—nHibernate Driver, printed Mar. 3, 2011.

* cited by examiner

TESTING INTEGRATED BUSINESS SYSTEMS

BACKGROUND

In the field of information technology, enterprise applications typically include numerous business systems. The software for each business system may be developed independently. This independent approach usually introduces challenges when the independently developed applications are deployed in a manner in which they must interact with each other. This may be especially so given the increasingly integrated nature of the typical enterprise application.

The testing of the integration, e.g., the calls between business systems, is known as staging, also end-to-end testing. Staging is intended to identify potential problems that may arise when independently developed applications interact with each other. Typically, this type of testing is performed at the end of a release cycle. In some cases, due to time and other resource constraints, staging may not be performed at all.

BRIEF DESCRIPTION OF THE DRAWINGS

Certain embodiments are described in the following detailed description and in reference to the drawings, in which.

DETAILED DESCRIPTION

In many cases, the resources are not available for staging enterprise applications. For example, it may not be practical to provide the computer resources necessary for two complete production environments, one for the business of the enterprise, and one for staging. As such, individual business systems may only perform silo testing.

In silo testing, the applications of a single business system are tested unto themselves, without testing calls to external applications. External applications may belong to external business systems, and as such, may not be available for testing. Due to circumstances such as these, the integration of enterprise applications may not be tested until the applications are deployed in a production environment.

In one embodiment, a relay test system may be used for coverage of integrated business systems. Coverage describes a portion of calls between different business systems that are tested. In other words, the coverage indicates to what degree the integration of an enterprise's applications is tested.

Figure 1:
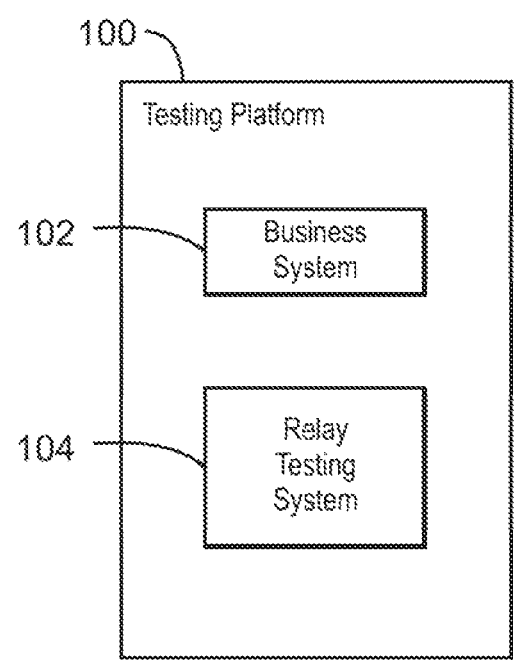
FIG. 1 is a block diagram of a testing platform in accordance with an embodiment.

FIG. 1 is a block diagram of a testing platform 100 in accordance with an embodiment. The testing platform 100 includes a business system 102 and a relay testing system 104.

The relay testing system 104 may be used to perform an end-to-end test of the business system 102. In the end-to-end test, the relay testing system 104 may test integration between business systems 102, provide alerts for integration errors, and provide alerts for a lack of coverage in areas of integration during the testing.

During testing of the business system 102, the relay testing system 104 may record calls to external applications. The business system 102 including these external applications may then be loaded onto the testing platform 100, and the recorded calls may be executed.

In this manner, the external calls may be treated like a baton in a relay race, where the external calls are handed off to the next business system, which then executes those calls. In turn, those calls may trigger further external calls to other business systems 102. The relay may be complete when the recorded calls are not further tested. Advantageously, the relay testing system may improve the quality of integration for newly deployed business systems.

Figure 2:
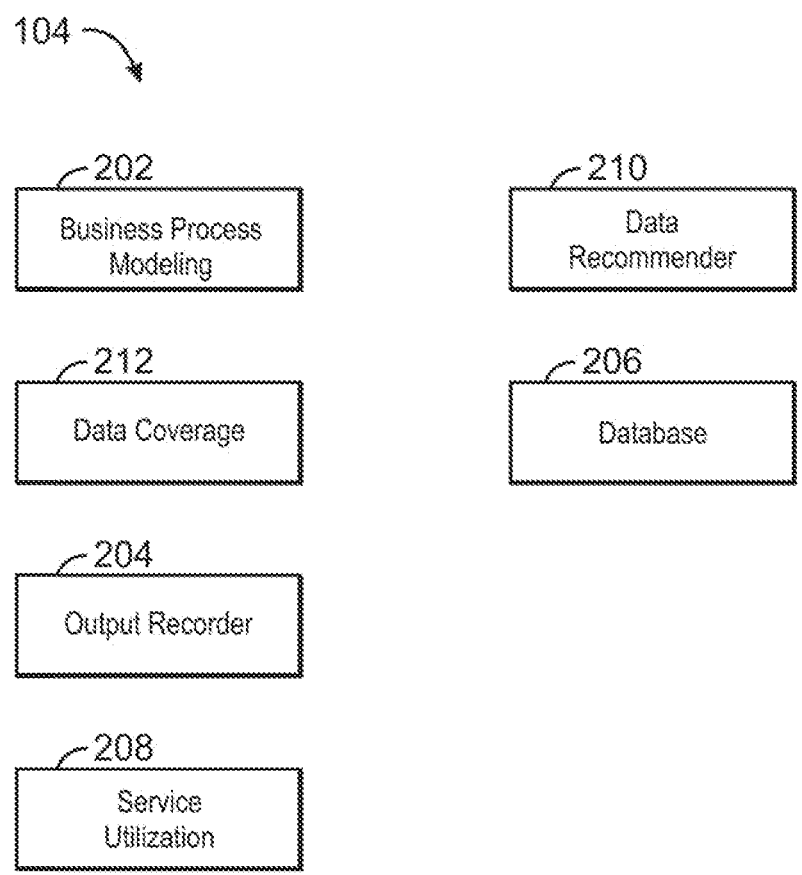
FIG. 2 is a block diagram of a relay testing system in accordance with an embodiment.

FIG. 2 is a block diagram of the relay testing system 104 in accordance with an embodiment. The relay testing system 104 may include business process modeling 202, an output recorder 204, a database 206, service utilization 208, a data recommender 210, and data coverage 212. The business process modeling 202 may model business processes, and the interactions of the various business systems 102.

The output recorder 204 may provide a mechanism that records or traps all outputs of one business system 102 intended for another, e.g., external business system. The output may include calls to external business systems, and data. The output may be recorded using application or communication hooks. In some embodiments, the output recorder 204 may be a non-intrusive network sniffing based communication recorder. The recorded outputs may be stored in the database 206.

In addition to external calls and other outputs, the database 206 may maintain various stores of data regarding the end-to-end testing. For example, information about which calls are tested may be stored in the database 206. The data in the database 206 may be used to conduct the end-to-end testing, and to produce data coverage reports and workflow visualizations. Data coverage reports may describe the coverage of the business systems 102 tested using the relay testing system 104. Workflow visualizations may show visualizations of currently tested integrations.

The service utilization 208 may respond to external calls from the business system 102 being tested. Because the external business system may not be available for testing, external calls may crash applications being tested. To prevent crashes, or to facilitate the testing, the service utilization 208 may complete the business processes, i.e., applications, making the external calls. This may be done using stubbing, response generation, and the like. In various embodiments, the service utilization 208 may use automatic or manual processes.

In one embodiment, the service utilization 208 may interface with the output recorder 204. For example, two business systems 102, system A and system B may be tested using the relay testing system 104. When system A is being tested, an application may make a call to another application in system B. The service utilization 208 may be triggered to complete the call without crashing the application. The service utilization 208 may also send a record of the call to the output recorder 204. The output recorder 204 may stored the record of the call in the database 206.

In some enterprises, mock services, or other techniques may be used in regard to external calls to applications not available on the testing platform 100. Implementations of the relay testing system 104 in such enterprises may not include the service utilization 208.

The data recommender 210 may "recommend" calls to test in the business system 102. The recommended calls may include calls recorded when another business system 102 was tested on the testing platform 100.

The data coverage 212 may describe coverage based on the recorded calls that are tested in each relay of the end-to-end testing. The data coverage 212 may provide the data coverage reports.

In one embodiment, the data coverage 212 may run, and query the database 206 to determine which calls have been tested. This determination may be further based on the business process modeling 202. In some embodiments, the data coverage 212 may determine whether the integration between System A and System B has been covered.

Figure 3:
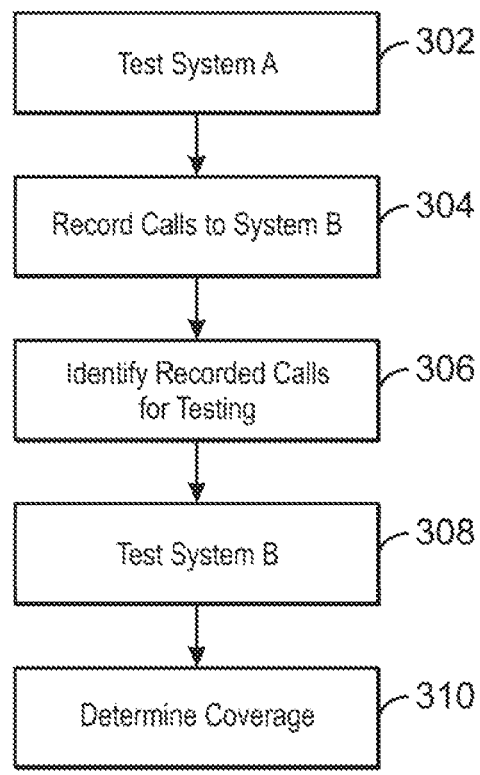
FIG. 3 is a process flow diagram of a method for testing integrated applications in accordance with an embodiment.

FIG. 3 is a process flow diagram of a method 300 for testing integrated applications in accordance with an embodiment. It should be understood that the process flow diagram is not intended to indicate a particular order of execution. The method 300 may be performed by the relay testing system 104 in end-to-end testing.

The method 300 begins at block 302, where system A is tested. The system A may be a business system 102. In one embodiment, system A may be loaded onto the testing platform 100.

At block 304, calls to system B may be recorded during the test of system A. Each call may be a request to execute a program in system B. The call may include specified parameters depending on the program.

At block 306, the data recommender 210 may recommend testing the recorded calls. In one embodiment, an interface may be presented to a user participating in an end-to-end test of systems A and B. In some embodiments, the user may query the database 206 to determine which programs to test in system B.

Once the testing of system A is concluded, at block 308, system B may be tested. In one embodiment, the system B may be loaded onto the testing platform 100. The calls recommended by the data recommender 210 may be tested. The test may also include the execution of other programs and parameters.

At block 310, the coverage of systems A and B may be determined. The coverage may be determined using data coverage reports. Based on the determination, further testing of systems A or B may proceed as described above.

Figure 4:
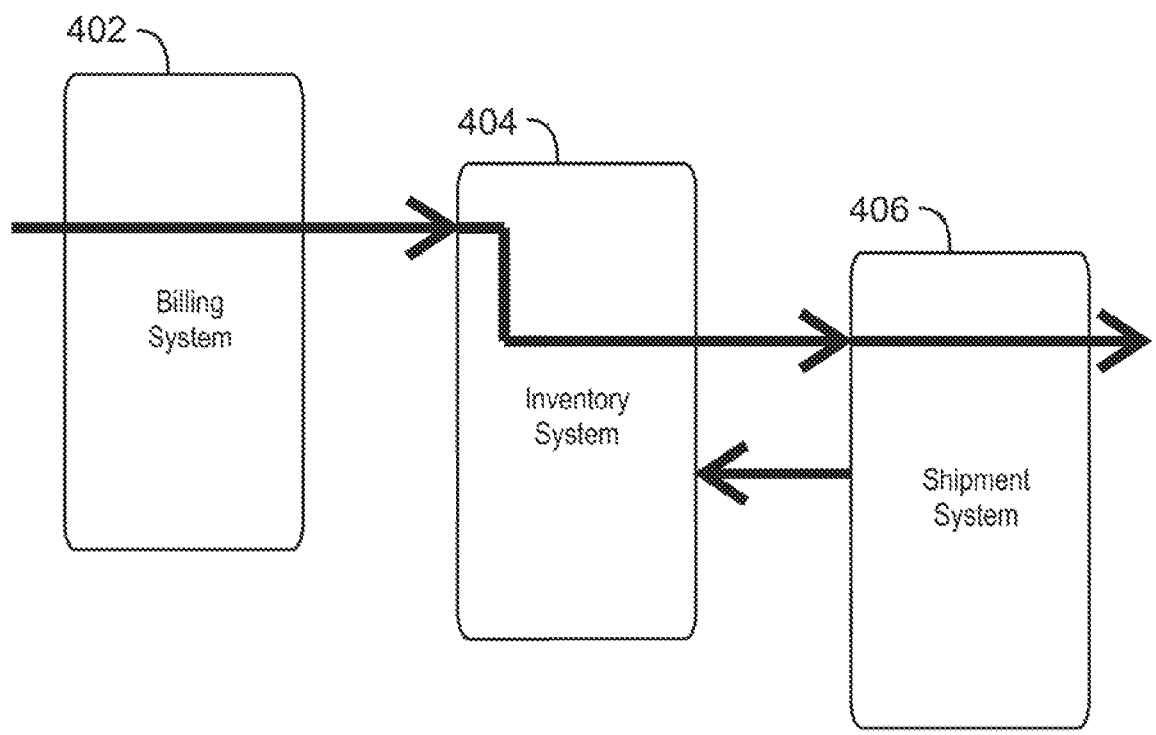
FIG. 4 is a block diagram of a system for relay testing in accordance with an embodiment.

FIG. 4 is a flow diagram showing an example end-to-end test of business systems in accordance with an embodiment. In each relay of the end-to-end test, various activities, e.g., billing activities, inventory activities, and shipment activities may be performed. Each of the activities may represent a test of corresponding business systems, e.g., billing system 402, inventory system 404, and shipment system 406.

In the end-to-end test, each business system may be silo tested during each relay of the end-to-end test. Further, during the silo test, all external service calls may be recorded and saved in the database 206. The data recommender 210 may recommend testing the programs in the inventory system 404 that were requested by the recorded external service calls. Those programs may then be tested during the silo test of the appropriate system.

For example, as shown, the billing system 402 makes external service calls to the inventory system 404. As such, during the during the silo test of the billing system 402, all external service calls to the inventory system 404 may be recorded. The data recommender 210 may then recommend the recorded service calls for testing to a user that is silo testing the inventory system 404. Accordingly, the recommended service calls may be tested during the silo testing of the inventory system.

Similar to the billing system 402, the inventory system 404 makes calls to the shipment system 406. Further, the shipment system 406 makes calls back to the billing system 402. As such, these calls are also recorded, and then tested during the silo testing of the respective systems. One implementation of end-to-end testing may include external service calls to more than one external system. For example, the billing system 402 may make external service calls to the inventory system 404 and the shipment system 406. Accordingly, the silo test of those systems may include the calls recorded during the silo test of the billing system 402. It should be noted that silo testing may include further transactions for testing, beyond the recorded service calls.

Figure 5:
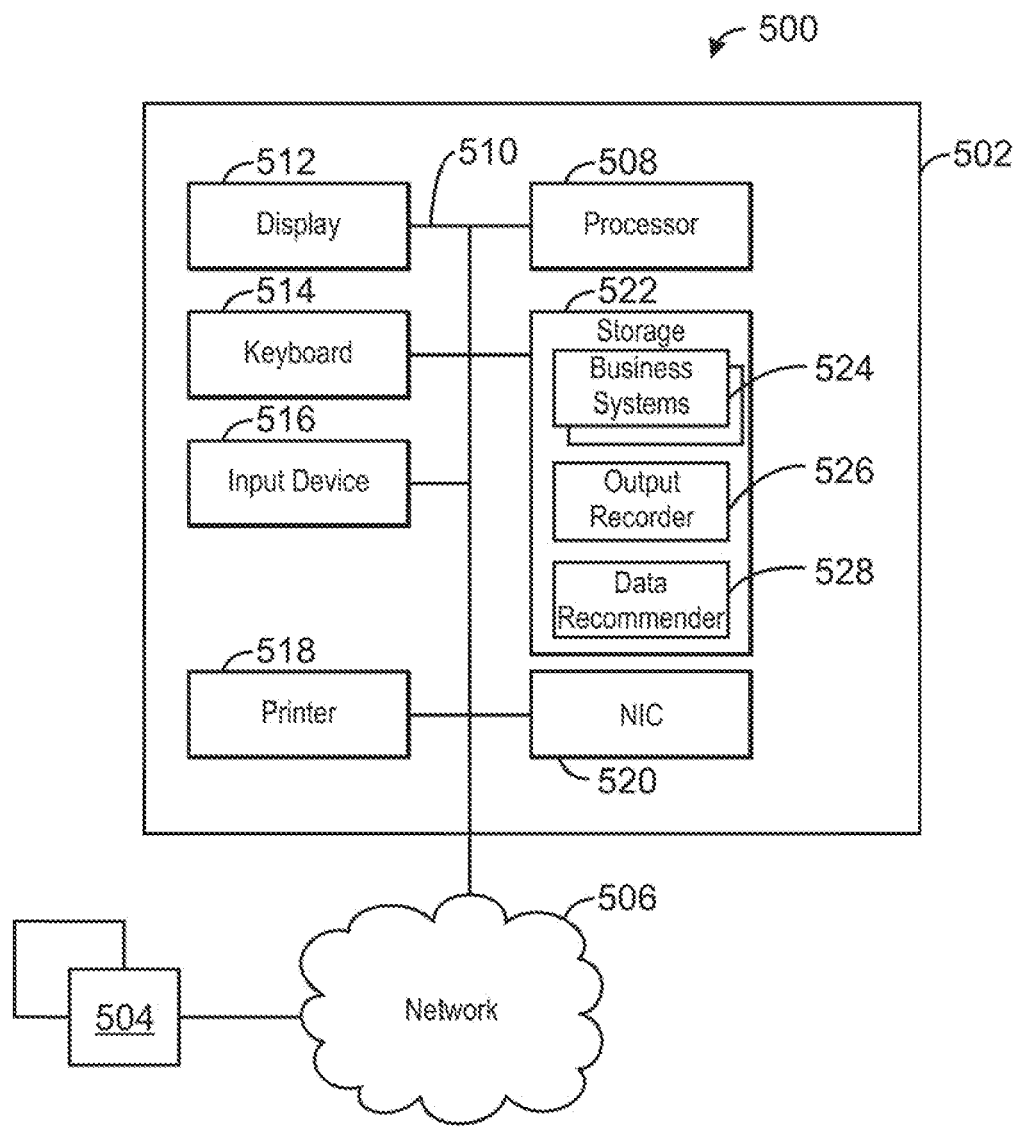
FIG. 5 is a block diagram of a system for relay testing in accordance with an embodiment.

FIG. 5 is a block diagram of a system 500 for relay testing in accordance with an embodiment. The functional blocks and devices shown in FIG. 5 may comprise hardware elements, software elements, or some combination of software and hardware. The hardware elements may include circuitry. The software elements may include computer code stored on a non-transitory, computer-readable medium. Additionally, the functional blocks and devices of the system 500 are but one example of functional blocks and devices that may be implemented in an embodiment. Specific functional blocks may be defined based on design considerations for a particular electronic device.

The system 500 may include a server 502 and a client 504, in communication over a network 506. The client 504 may be similarly configured to the server 502. For example, the server 502 may include a processor 508, which may be connected through a bus 510 to a display 512, a keyboard 514, an input device 516, and an output device, such as a printer 518. The input devices 516 may include devices such as a mouse or touch screen. The server 502 may also be connected through the bus 510 to a network interface card 520. The network interface card 520 may connect the server 502 to the network 506.

The network 506 may be a local area network, a wide area network, such as the Internet, or another network configuration. The network 506 may include routers, switches, modems, or any other kind of interface device used for interconnection. In one example embodiment, the network 506 may be the Internet.

The server 502 may have other units operatively coupled to the processor 512 through the bus 510. These units may include non-transitory, computer-readable storage media, such as storage 522. The storage 522 may include media for the long-term storage of operating software and data, such as hard drives. The storage 522 may also include other types of non-transitory, computer-readable media, such as read-only memory and random access memory.

The storage 522 may include the machine readable instructions used in embodiments of the present techniques. In an embodiment, the storage 522 may include business systems 524, an output recorder 526, and a data recommender 528. During an end-to-end test of the business systems 524, the output recorder 526 may record calls between the business systems 524. The data recommender 528 may recommend the recorded calls to a user participating in the end-to-end test. The recommended calls may be tested accordingly.

Figure 6:
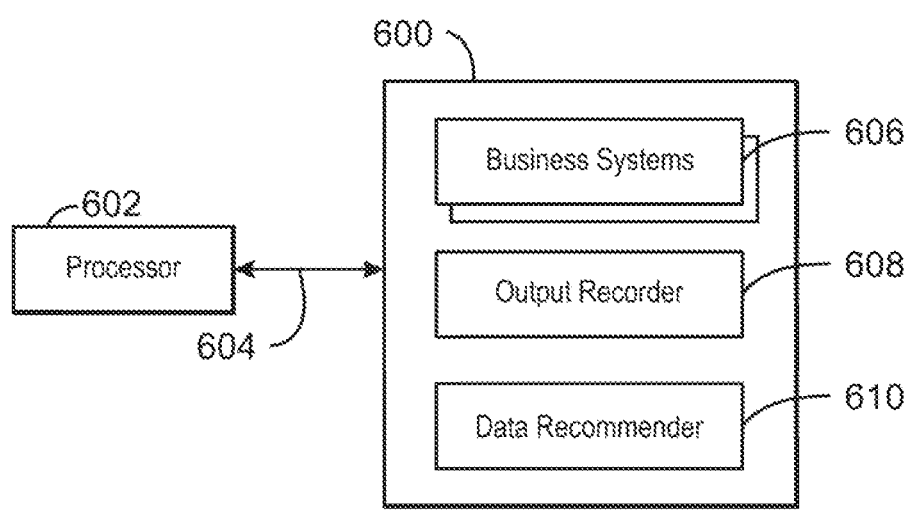
FIG. 6 is a block diagram showing a non-transitory, computer-readable medium that stores code for relay testing in accordance with an embodiment.

FIG. 6 is a block diagram showing a non-transitory, computer-readable medium that stores code for relay testing in accordance with an embodiment. The non-transitory, computer-readable medium is generally referred to by the reference number 600.

The non-transitory, computer-readable medium 600 may correspond to any typical storage device that stores computer-implemented instructions, such as programming code or the like. For example, the storage device may include a hard disk drive, a magnetic disk drive, e.g., to read from or write to a removable magnetic disk, and an optical disk drive, e.g., for reading a CD-ROM disk or to read from or write to other optical media. Further, other types of media that are readable by a computer system and that are suitable to the desired end purpose may be used, such as magnetic cassettes, flash memory cards, digital video disks, Bernoulli cartridges, and the like.

The storage device may be connected to a system bus by a storage device interface, such as a hard disk drive interface, a magnetic disk drive interface and an optical drive interface. For example, the storage device may be the storage 522 discussed with respect to FIG. 5.

When read and executed by a processor 602 via a communication path 604, the instructions stored on the non-transitory, computer-readable medium 600 are adapted to cause the processor 602 to perform an end-to-end test of the business systems 524 according to an example embodiment, as described herein.

The business systems 606 may be loaded onto a testing platform. During testing of the business systems 606, the output recorder 608 may record external calls between the business systems 606. The data recommender 610 may recommend the recorded calls for testing during the end-to-end test of the business systems 606. The recommended calls may be tested.

What is claimed is:

1. A method of testing a first business system and a second business system comprising;
   performing a test of the first business system, wherein the first business system is integrated with the second business system;
   recording one or more calls from the first business system to the second business system during the test of the first business system; and
   identifying the one or more calls from the first business system for a test of the second business system;
   determining one or more identifiers corresponding to the one or more programs of the second business system based on the one or more calls from the first business system;
   determining one or more parameters for each of one or more calls; and
   generating a data store comprising:
      the one or more identifiers; and
      the one or more parameters.

2. The method recited in claim 1, comprising:
   performing the test of the second business system; and
   testing the one or more calls during the test of the second business system.

3. The method recited in claim 1, comprising:
   recording one or more calls from the second business system to a third business system during the test of the second business system; and
   recommending the one or more calls from the second business system for testing during a test of the third business system.

4. The method recited in claim 1, wherein each f the one or more calls comprise a request to execute one or more programs of the second business system, wherein the one or more programs correspond to the one or more calls.

5. The method recited in claim 1, comprising:
   determining a coverage of an interface between the first business system and the second business system based on the test of the second business system; and
   presenting a display of the coverage.

6. The method recited in claim 1, comprising executing one or more stubs corresponding to the one or more calls from the first business system.

7. The method recited in claim 1, comprising performing one or more response generations corresponding to the one or more calls from the first business system.

8. A computer system for testing a first business system and a second business system, comprising:
   a memory storing instructions;
   a processor configured to execute the instructions to;
      perform a test of the first business system, wherein the first business system is integrated with the second business system;
      record one or more calls from the first business system to the second business system during the test of the first business system; and
      identify the one or more calls from the first business system for a test of the second business system;
      record one or more calls from the second business system to a third business system during the test of the second business system; and
      identify the one or more calls from the second business system for testing during a test of the third business system.

9. The computer system recited in claim 8, wherein the processor is configured to execute the instructions to:
   perform the test of the second business system; and
   test the one or more cans during the test of h second business system.

10. The computer system recited in claim 8, wherein each of the one or more calls comprise a request to execute one or more programs of the second business system, wherein the one or more programs correspond to the one or more calls.

11. The computer system recited in claim 8, wherein the processor is configured to execute the instructions to record the one or more calls from the first business system by executing instructions to:
    determine one or more identifiers corresponding to the one or more programs of the second business system based on the one or more calls from the first business system;
    determine one or more parameters for each of the one or more calls; and
    generate a data store comprising:
       the one or more identifiers; and
       the one or more parameters.

12. The computer system recited in claim 8, wherein the processor is configured to execute the instructions to:
    determine a coverage of an interface between the first business system and the second business system based on the test of the second business system; and
    present a display of the coverage.

13. The computer system recited in claim 8, wherein the processor is configured to execute the instructions to execute one or more stubs corresponding to the one or more calls from the first business system.

14. The computer system recited in claim 8, wherein the processor is configured to execute the instructions to perform one or more response generations corresponding to the one or more calls from the first business system.

15. A non-transitory, computer-readable medium comprising machine-readable instructions executable by a processor to test a first business system and a second business system, wherein the machine-readable instructions, when executed by the processor, cause the processor to:
perform a test of the first business system, wherein the first business system is integrated with the second business system;
record one or more calls from the first business system to the second business system during the test of the first business system, wherein each of the one or more calls comprise a request to execute a corresponding one or more programs of the second business system; and
identify the one or more calls from the first business system for testing during a test of the second business system.

16. The non-transitory, computer-readable medium recited in claim 15, comprising machine-readable instructions which, when executed by the processor, cause the processor to:
perform the test of the second business system; and
test the one or more calls during the test of the second business system.

17. The non-transitory, computer-readable medium recited in claim 15, comprising machine-readable instructions which, when executed by the processor, cause the processor to:
record one or more calls from the second business system to a third business system during the test of the second business system; and
recommend the one or more calls from the second business system for testing during a test of the third business system.

18. The non-transitory, computer-readable medium recited in claim 15, wherein the machine-readable instructions which, when executed by the processor, cause the processor to record the one or more calls from the first business system comprise machine-readable instructions which, when executed by the processor, cause the processor to:
determine one or more identifiers corresponding to the one or more programs of the second business system based on the one or more calls from the first business system;
determine one or more parameters for each of the one or more calls; and
generate a data store comprising:
the one or more identifiers; and
the one or more parameters.

* * * * *

UNITED STATES PATENT AND TRADEMARK OFFICE
CERTIFICATE OF CORRECTION

PATENT NO.        : 9,208,045 B2                                            Page 1 of 1
APPLICATION NO.   : 14/001710
DATED             : December 8, 2015
INVENTOR(S)       : Ilan Shufer et al.

It is certified that error appears in the above-identified patent and that said Letters Patent is hereby corrected as shown below:

On The Title Page
Item (57) in the Abstract, in the last line, delete "far" and insert -- for --, therefor.

In the Claims
In column 5, line 64, in Claim 4, delete "f" and insert -- of --, therefor.

Signed and Sealed this
Twelfth Day of July, 2016

Michelle K. Lee
*Director of the United States Patent and Trademark Office*